(12) United States Patent
Hill

(10) Patent No.: US 6,443,295 B1
(45) Date of Patent: Sep. 3, 2002

(54) MOTORIZED CONVEYOR PULLEY WITH REDUCED INTERNAL LOADING

(75) Inventor: Jason J. Hill, Manchester, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/477,952

(22) Filed: Jan. 5, 2000

(51) Int. Cl.⁷ ................................................ B65G 13/06
(52) U.S. Cl. ...................... 198/788; 198/835; 474/197; 474/199
(58) Field of Search ................................. 474/107, 108, 474/166, 197, 199; 475/149; 277/551; 198/788, 835; 384/147, 484, 486, 418, 419, 546, 587

(56) References Cited

U.S. PATENT DOCUMENTS

| | | |
|---|---|---|
| 2,915,167 A | 12/1959 | Berger |
| 3,217,554 A | * 11/1965 | Stalker ........................ 198/835 |
| 4,989,398 A | * 2/1991 | Kuhn et al. .................. 56/17.5 |
| 5,732,813 A | * 3/1998 | Nielson et al. ............. 198/788 |
| 5,811,137 A | * 9/1998 | Clark et al. ................. 425/194 |
| 6,164,935 A | * 12/2000 | Turiansky .................... 417/534 |

FOREIGN PATENT DOCUMENTS

| | | |
|---|---|---|
| DE | 40 40 844 A | 7/1992 |
| DE | 44 20 669 A | 1/1995 |
| WO | WO99/00317 | 1/1999 |

OTHER PUBLICATIONS

Cover page from Van Gorp Motorized Conveyors Pulleys publication; MCP–97; not dated.

* cited by examiner

Primary Examiner—Thomas R. Hannon
Assistant Examiner—Vicky A. Johnson
(74) Attorney, Agent, or Firm—Harness, Dickey & Pierce, P.L.C.

(57) ABSTRACT

In a motorized conveyor pulley of the type comprising a cylindrical pulley drum with axially opposite end plates enclosing an electric motor and drive transmission, the pair of end plates of the pulley are constructed with an increased axial thickness compared to prior art end plates and are supported on a pair of shaft ends by pairs of bearings and are sealed by a pair of lubricant seals between each pair of bearings. The enlarged end plates and the pairs of bearings resist bending loads exerted on the conveyor pulley by the conveyor belt and thereby reduce loading stresses on the motor and drive transmission contained in the pulley permitting more economical manufacture of the motor and drive transmission.

22 Claims, 2 Drawing Sheets

MOTORIZED CONVEYOR PULLEY WITH REDUCED INTERNAL LOADING

BACKGROUND OF THE INVENTION

(1) Field of the Invention

The present invention pertains to a motorized conveyor pulley of the type comprising a cylindrical pulley drum with axially opposite end plates enclosing an electric motor and drive transmission. The end plates of the pulley are mounted on a pair of shaft ends that pass through the end plates at the axially opposite ends of the pulley and support the motor and drive transmission in the pulley. In particular, the present invention pertains to the pair of end plates of the pulley that are constructed with an increased axial thickness compared to prior art end plates and are supported on the pair of shaft ends by pairs of bearings and are sealed by a pair of lubricant seals between each pair of bearings. The enlarged end plates and the pairs of bearings resist bending loads exerted on the conveyor pulley by the conveyor belt and thereby reduce loading stresses on the motor and drive transmission contained in the pulley permitting more economical manufacture of the motor and drive transmission.

(2) Description of the Related Art

A motorized conveyor pulley is employed at one end of a flat, continuous belt conveyor where the belt of the conveyor is looped or wrapped over the motorized conveyor pulley at one end of the conveyor and wrapped over an idler pulley at an opposite end of the conveyor. In order to provide sufficient friction engagement between the pair of pulleys and the belt to avoid slipping of the belt on the pulleys when the belt is conveying a substantial load, the belt is usually stretched very tight between the pair of pulleys resulting in a substantial load exerted on the pulleys by the belt.

The load exerted by the belt on the motorized conveyor pulley is transferred to the component parts contained inside the pulley. A typical motorized conveyor pulley includes a cylindrical pulley drum having a hollow interior. A pair of circular end plates close off the axially opposite ends of the drum. The end plates have coaxial center bores and stationary stub shafts extend through the center bores. Each stub shaft has a bearing mounted on its exterior that is received in the center bore of one of the end plates, thereby mounting the pulley drum for rotation on the stationary stub shafts.

Contained inside the pulley drum is an electric motor and a gear carrier that are mounted stationary to the ends of the two stub shafts projecting into the interior of the pulley drum. The electric motor drives a gear transmission mounted on the gear carrier that in turn drives a ring gear mounted on the interior of one of the pulley end plates imparting rotation to the pulley drum. The pulley drum contains a bath of lubricant, at times filling half the interior volume of the drum, that both cools and lubricates the motor and the transmission gearing.

The substantial load exerted on the motorized conveyor pulley by the conveyor belt causes the pulley to bend between the ends of the stub shafts projecting from the axially opposite ends of the pulley drum. The bending of the pulley drum is transferred through the end plates to the internal components of the motorized conveyor pulley. This at times would result in the bending of the gear carrier in the interior of the pulley drum which would result in gears of the transmission coming out of mesh, excessive gear chatter or gear noise and at times the breaking of gear teeth. The bending of the drum would also result in the leakage of lubricant past lip seals mounted on the stub shafts in the center bores of the pulley end plates.

The prior art solution to the bending transferred to the internal components of the pulley was to beef up the construction of the internal components. For example, the end shield of the motor to which the gear carrier of the transmission was attached would be constructed of cast iron or other cast metal with an increased thickness to resist the bending of the end shield. In addition, the gear carrier of the transmission connected to the motor end shield would be cast with an increased thickness or with reinforcing gussets or webs to resist the bending of the gear carrier. Unfortunately, beefing up the construction of the component parts of the motorized conveyor pulley significantly increases the cost of manufacturing the motorized conveyor pulley.

What is needed to overcome the problem of bending of motorized conveyor pulleys is an improved construction of the pulley that isolates the internal components of the motorized conveyor pulley from the bending loads without appreciably increasing the cost of manufacture of the internal components and the motorized conveyor pulley.

SUMMARY OF THE INVENTION

The motorized conveyor pulley of the invention eliminates or significantly reduces the bending of the cylindrical pulley drum due to the conveyor belt load and thereby isolates the internal component parts of the pulley from stresses due to bending. The motorized conveyor pulley of the invention is similar to prior art conveyor pulleys in that it is comprised of a cylindrical pulley drum having a hollow interior with end plates at the axially opposite ends of the drum. However, the axial thickness of the end plates is substantially increased. By increasing the thickness of the end plates, the axial length of the center bores passing through the end plates is also increased. The increase in the axial length of the center bores allows the positioning of pairs of bearings inside the center bores and on the stub shaft ends that pass through the center bores. In the preferred embodiment of the invention, the increased axial thickness of the end plates and the increased length of the end plate center bores allows the positioning of two axially spaced bearings in each of the center bores and on each of the stub shaft ends. The axial spacing of the pairs of bearings also allows the positioning of a shaft seal in each center bore between the pairs of bearings. In the preferred embodiment, the axial spacing allows the positioning of two shaft seals on each stub shaft providing a redundant system for preventing leakage of lubricant from the interior of the pulley drum. The use of two bearings mounting each end plate of the pulley drum on each of the stub shaft ends effectively unloads all of the internal components of the pulley from excessive loading due to belt tension bending. In an extreme comparison, the pair of stub shaft ends, their associated pairs of bearings and the end plates of the pulley drum they support may exist without any internal support required to satisfactorily take up the belt tension loading.

BRIEF DESCRIPTION OF THE DRAWINGS

Further objects and features of the invention are revealed in the following detailed description of the preferred embodiment of the invention and in the drawing figures, wherein.

DETAILED DESCRIPTION OF THE PREFERRED EMBODIMENT

Figure 1:
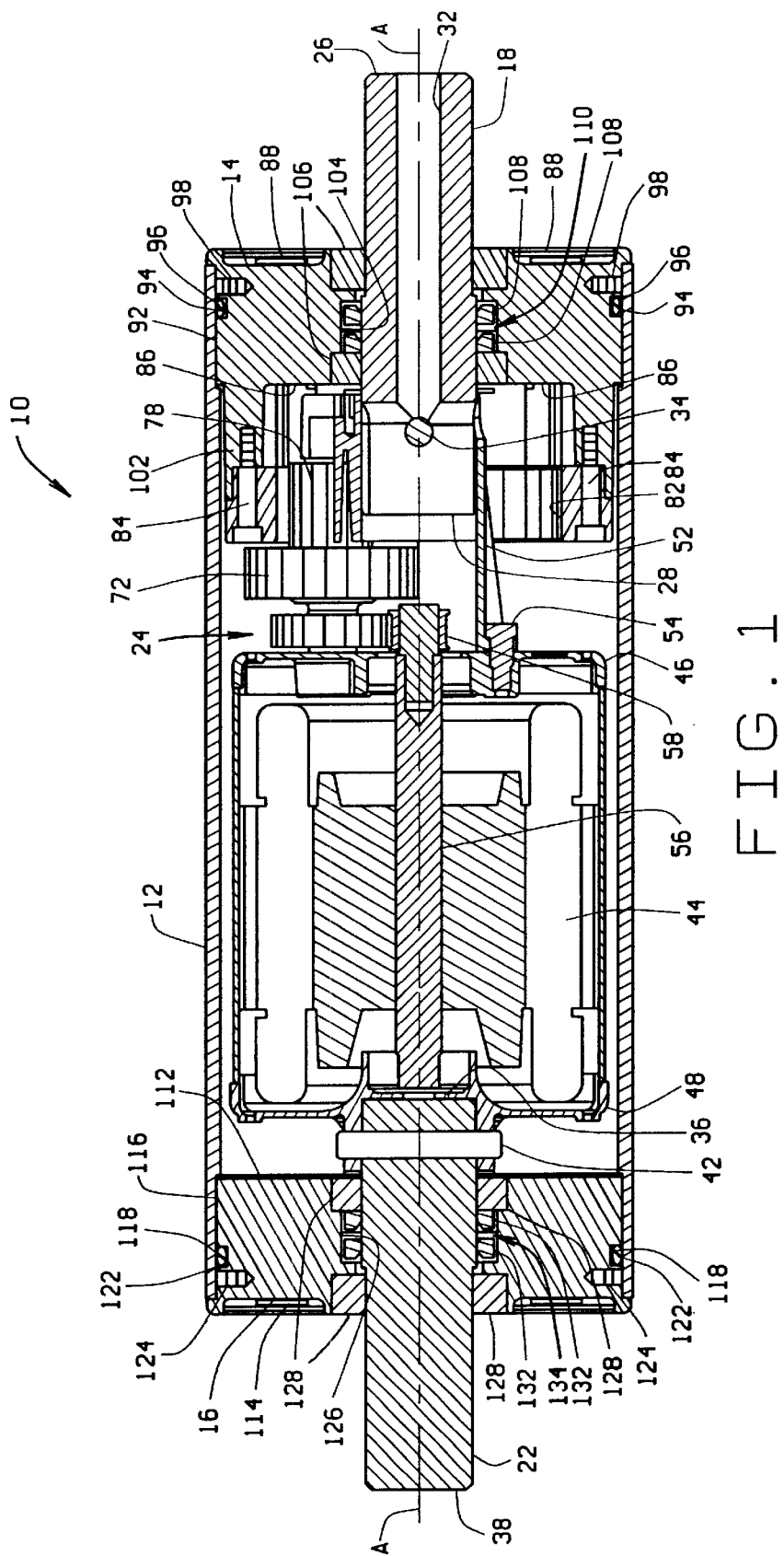
FIG. 1 is a side view in section of the motorized conveyor pulley of the present invention.

FIG. 1 shows the motorized conveyor pulley 10 of the present invention. The motorized conveyor pulley 10 is similar to prior art motorized conveyor pulley constructions in that it is basically comprised of a cylindrical pulley drum 12 having a center axis of rotation A, a first end plate 14 and a second end plate 16 at axially opposite ends of the pulley drum 12, a first stub shaft end 18 and a second stub shaft end 22 at axially opposite ends of the conveyor pulley 10, and a drive assembly 24 contained in the interior of the pulley drum 12.

The first and second shaft ends 18, 22 are similar to the shaft ends employed in prior art motorized conveyor pulleys. The first shaft end 18 has a cylindrical exterior surface and axially opposite exterior 26 and interior 28 ends. A hollow bore 32 passes through the center of the first shaft end. The hollow bore 32 is employed in routing electrical wiring (not shown) from the motor of the drive assembly 24 from the interior of the motorized conveyor pulley 10 through the bore 32 to the exterior of the pulley. A pin 34 passes through the first shaft end 26 securing the shaft adjacent its interior end 28 to a gear carrier of the drive assembly to be described. The second shaft end 22 also has a cylindrical exterior surface and axially opposite interior 36 and exterior 38 ends. Unlike the first shaft end, the second shaft end is solid but it does also include a pin 42 securing the second shaft end 22 to the motor of the drive assembly 24 yet to be described. In the operative environment of the motorized conveyor pulley 10 both the first shaft end 18 and second shaft end 22 are fixed stationary to a support structure of the conveyor system (not shown) in which the motorized conveyor pulley 10 is employed.

Figure 2:
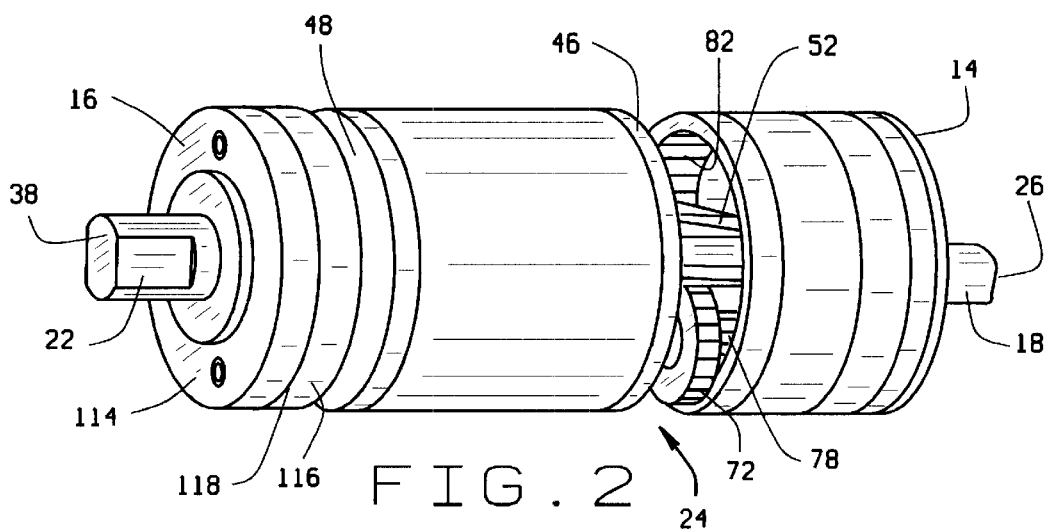
FIG. 2 is a perspective view of the conveyor pulley of FIG. 1 removed from the cylindrical pulley drum.
Figure 3:
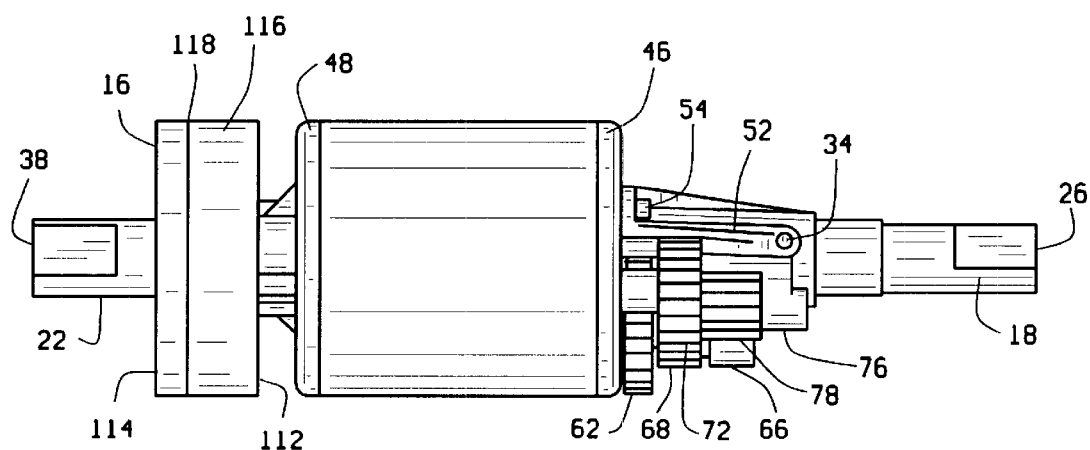
FIG. 3 is a side view of the conveyor pulley of FIG. 2 with one of the conveyor end plates removed and with the ring gear of the pulley transmission removed.

As stated above, a pin 42 secures the interior end 36 of the second shaft end 22 to a motor 44 of the conveyor pulley drive assembly 24. The motor 44 shown in FIGS. 1 through 3 is only one example of an electric motor which may be employed with the conveyor pulley of the invention. Unlike prior art motors employed in motorized conveyor pulleys however, the motor 44 can be an off the shelf motor and it is not necessary that its construction, in particular the construction of its opposite end shields 46, 48, be beefed up to resist bending forces exerted on the internal components of typical prior art motorized conveyor pulleys. As shown in FIG. 1, a second end shield 48 of the motor is secured to the second shaft end 22 by the pin 42. The pin 42 secures the motor 44 stationary to the second shaft end 22.

A gear carrier 52 that makes up a part of the motorized conveyor pulley of the invention is connected between the first end shield 46 of the motor 44 and the first shaft end 18. The gear carrier 52 is secured to the first shaft end 18 by a pin 34. The opposite end of the gear carrier or the left hand end of the carrier as seen in FIG. 1 is secured to the first end shield 46 of the motor by threaded fasteners 54. The gear carrier 52 is shown removed from the motorized conveyor pulley 10 and attached between the first end shield 46 and the first shaft end 26 in FIG. 4.

Figure 4:
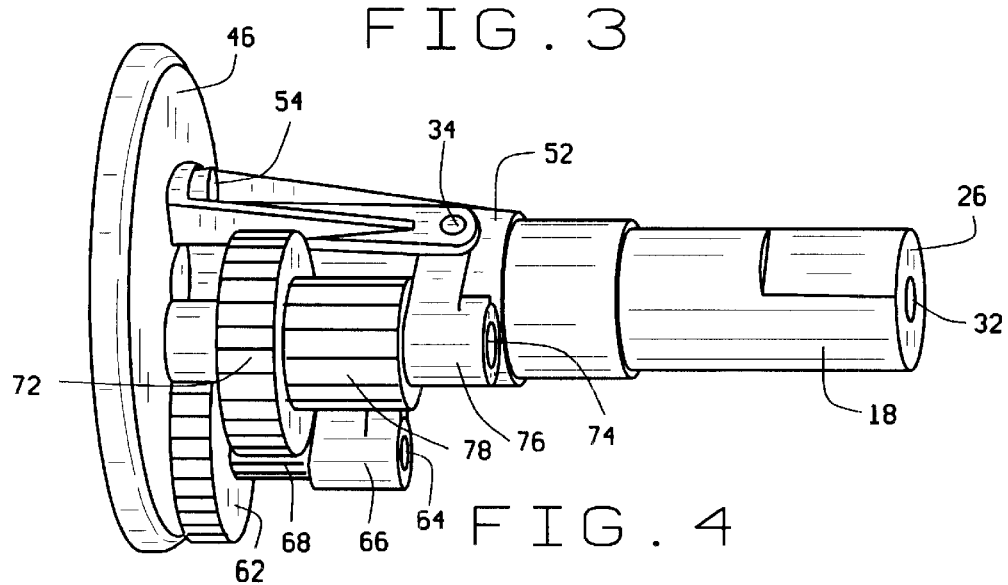
FIG. 4 is a side perspective view of the transmission mechanism of the conveyor pulley.

The gear carrier 52 is an improvement over prior art gear carriers in that it supports both ends of gear shafts of a reduction transmission of the drive assembly 24 where prior art transmissions often employed cantilevered shafts, or shafts supported at only one end. The particular transmission shown in the drawing figures is an example of only one type of gearing transmission that may be employed with the motorized drive pulley 10 of the invention. The particular transmission shown employs two pairs of gears, with each pair of gears mounted on a common shaft. As seen in FIG. 1, the motor 44 has a drive shaft 56 with an output gear 58 mounted on the drive shaft. The motor output gear 58 is not shown in FIG. 4. The motor output gear 58 meshes with a larger gear 62 of a first pair of gears mounted on a first shaft 64. As seen in FIG. 4, one end of the first shaft 64 is mounted to the first end shield 46 of the motor and the opposite end is mounted in a first journal 66 of the gear carrier 52. Thus, the opposite ends of the first shaft 64 are both supported for rotation. A smaller gear 68 of the first pair of gears is also mounted on the first shaft for rotation with the large gear 62. The smaller gear 68 meshes with a larger gear 72 of the second pair of gears mounted on a second transmission shaft 74. The second gear shaft 74 is also mounted for rotation at its opposite ends in the first end shield 46 of the motor at one end and a second journal 76 of the gear carrier at its opposite end. A smaller second gear 78 is also mounted on the second gear shaft 74 for rotation with the larger second gear 72. The smaller second gear 78 meshes with an internally threaded ring gear 82 that is secured by threaded fasteners 84 to the first end plate 14 of the motorized conveyor pulley. Thus, the construction of the gear carrier 52 of the invention supports both the first gear shaft 64 and the second gear shaft 74 in respective first 66 and second 76 gear journals at one end of the shafts with the opposite ends of the gear shafts being supported in journals provided in the first end shield 46 of the motor 44. With the particular drive transmission shown in the drawing figures, rotation of the motor output gear 58 drives the large gear 62 of the first pair of gears. Rotation of the large gear 62 is also transmitted to rotation of the smaller gear 68 of the first pair of gears. The smaller gear 68 of the first pair meshes with the larger gear 72 of the second pair transmitting its rotation to the larger second gear. Rotation of the larger gear 72 of the second pair also causes rotation of its associated smaller gear 78. The smaller gear 78 of the second pair meshes with the ring gear 82 fastened to the first end plate 14 and thereby transmits rotation to the first end plate and the pulley drum 12.

The constructions of the first and second end plates 14, 16 and the manner in which they are mounted to the respective first and second shaft ends 18, 22 are the primary improvements provided by the motorized conveyor pulley 10 of the invention.

The first end plate 14 has an increased axial thickness over that of prior art end plates. The end plate 14 is circular and has axially opposite interior 86 and exterior 88 surfaces. The end plate has a cylindrical peripheral surface 92 that is dimensioned to fit in tight friction engagement in a first opening of the cylindrical pulley drum 12 on the right-hand end of the drum as seen in FIG. 1. An annular groove 94 is formed in the peripheral surface and an o-ring 96 is received in the groove providing a seal between the peripheral surface and the interior surface of the pulley drum 12. A plurality of internally threaded fastener holes 98 are also formed into the peripheral surface at circumferentially spaced positions. The fastener holes 98 receive threaded fasteners that attach the first end plate 14 to the first end of the pulley drum 12. An annular collar 102 having an exterior diameter dimension that is slightly smaller than that of the peripheral surface 92 projects inwardly from the interior surface 86 of the first end plate 14. The ring gear 82 of the drive assembly transmission is secured to the annular collar by threaded fasteners 84. A cylindrical center bore 104 passes through the center of the first end plate. As seen in FIG. 1, the center bore 104 is formed in the center of the first end plate 14 with portions of the center bore having different interior diameter dimensions. The portions of the center bore adjacent the interior surface 86 and exterior surface 88 of the end plate have the largest interior diameter dimensions and are dimensioned to receive a first pair of bearings 106. The first pair of bearings 106 can be any type of commercially available bearing assemblies and will be chosen depending on the overall size of the motorized conveyor pulley 10 and the belt loads to which it will be subjected. As seen in FIG. 1, each bearing of the first pair of bearings 106 has an axial dimension and the combined axial dimensions of the bearings 106 is less than the minimum axial thickness of the first end plate 14 measured between its interior surface 86 and its exterior surface 88. This provides an axial spacing in the center bore 104 between the first pair of bearings 106. In the preferred embodiment of the invention the axial spacing is occupied by a seal assembly. Also in the preferred embodiment of the invention the seal assembly is comprised of a pair of annular seals 108 mounted on the exterior surface of the first shaft end 18 and in the center bore 104 of the first end plate. The pair of annular seals 108 are mounted on the first shaft end 18 with a small axial spacing 110 between the seals. The small axial spacing 110 is provided to contain a small amount of lubricant between the two seals 108. Keeping the seals lubricated in this manner extends their working life, preventing the seals from leaking. A zert fitting (not shown) could also be added to the first end plate 14 with a conduit communicating between the zert fitting and the axial spacing 110 between the seals 108 to resupply lubricant to the axial spacing between the seals when needed.

The second end plate 16 is a mirror image of the first end plate 14 except that it does not include the annular collar 102 of the first end plate. Like the first end plate, the second end plate 16 has opposite interior 112 and exterior 114 surfaces with a cylindrical peripheral surface 116 extending therebetween. The peripheral surface 116 is dimensioned to fit tight inside a second opening of the pulley drum 12 to the left of the drum as viewed in FIG. 1. The peripheral surface 116 has an annular groove 118 that receives an o-ring 122 that provides a seal between the peripheral surface of a second end plate and the interior surface of the cylindrical pulley drum 12 at the second end of the drum. The second end plate peripheral surface 116 is also provided with a plurality of internally threaded holes 124 that receive threaded fasteners that attach the second end plate to the second end of the pulley drum 12. A cylindrical center bore 126 passes through the center of the second end plate 16. As with the first end plate, the center bore 126 of the second end plate is formed with portions having different interior diameter dimensions. The portions of the center bore adjacent the end plate interior surface 112 and exterior surface 114 have the larger diameter dimensions and are dimensioned for receiving a second pair of bearings 128 therein. Each bearing of the second pair of bearings 128 has an axial dimension and the combined axial dimensions of the second pair of bearings is less than the minimum axial thickness of the second end plate 16 between its interior surface 112 and exterior surface 114. This provides an axial spacing between the second pair of bearings 128 in the second end plate center bore 126. The axial spacing is occupied by a seal assembly comprised of a pair of annular seals 132. The pair of annular seals seal between the exterior surface of the second shaft end 22 and the interior surface of the second end plate center bore 126. As with the first pair of annular seals 108, an axial spacing 134 is also provided between the pair of annular seals 132 mounted on the second shaft end 22. The axial spacing 134 is provided to contain an amount of lubricant to extend the working life of the seals 132. A zert fitting (not shown) could also be provided on the second end plate 16 to supply lubricant to the axial spacing between the annular seals when needed.

The increased axial thickness of the first and second end plates 14, 16 and their associated pairs of bearings 106, 128 mounted in the center bores of the end plates adjacent their interior and exterior surfaces effectively unloads all of the internal components of the motorized conveyor pulley from excessive loading due to belt tension. In an extreme comparison, the first and second shaft ends 18, 22 and the pairs of bearings 106, 128 could exist without any internal support from the internal components of the conveyor pulley 10 and satisfactorily take up the belt tension loading. The arrangements of the pairs of annular seals 108, 132 between the pairs of bearings isolates the seals from the belt tension loads and thereby provides an improved seal of the conveyor pulley over that of the prior art. By eliminating the bending and deflection, stresses on the bearings, the gears and other internal component parts of the conveyor pulley are reduced, allowing use of less expensive materials to construct the motor and the drive transmission assembly. Instead of cast iron end shields employed in prior art motorized conveyor pulleys, cast aluminum may be used for the end shields as well as for the transmission gear carrier and transmission gears. The ability of the axially spaced bearings in each of the end plates to isolate the internal components from bending loads could also lead to the use of plastics in the motor and transmission constructions.

While the present invention has been described by reference to specific embodiments, it should be understood that modifications and variations of the invention may be constructed without departing from the scope of the invention defined in the following claims.

What is claimed:

1. A conveyor pulley comprising:
   a pulley having a cylindrical exterior surface and first and second end plates at axially opposite ends of the exterior surface, the first and second end plates having respective first and second center bores;
   a first shaft end extending into the first end plate center bore;
   a second shaft end extending into the second end plate center bore; and,
   a first pair of bearings mounted on the first shaft end and mounted in the first end plate center bore, said first pair of bearings being axially spaced and having an axial thickness, the sum of said axial thickness of said bearings and the axial spacing between said bearings being substantially equal to the axial thickness of said end plate in the area within which said first pair of bearings is mounted;
   wherein one of said first pair of bearings has an outer surface positioned in substantially coplanar relationship with an outer surface of said end plate and the other of said first pair of bearings has an inner surface positioned in substantially coplanar relationship with an inner surface of said end plate.

2. The conveyor pulley of claim 1, wherein:
   the first shaft end and second shaft end are coaxial and the first pair of bearings are spaced axially from each other on the first shaft end.

3. The conveyor pulley of claim 1, wherein:
   a second pair of bearings is mounted on the second shaft end and is mounted in the second end plate center bore.

4. The conveyor pulley of claim 3, wherein:
the first pair of bearings are spaced axially from each other on the first shaft end and the second pair of bearings are spaced axially from each other on the second shaft end.

5. The conveyor pulley of claim 3, wherein:
the first end plate has axially opposite exterior and interior surfaces and the first pair of bearings are positioned adjacent the exterior and interior surfaces of the first end plate and the second end plate has axially opposite exterior and interior surfaces and the second pair of bearings are positioned adjacent the exterior and interior surfaces of the second end plate.

6. The conveyor pulley of claim 3, wherein:
the first end plate has a first axial thickness and the second end plate has a second axial thickness, the bearings of the first pair of bearings each have an axial thickness and a combined axial thickness of the first pair of bearings is less than the axial thickness of the first end plate and the bearings of the second pair of bearings each have an axial thickness and a combined axial thickness of the second pair of bearings is less than the axial thickness of the second end plate.

7. The conveyor pulley of claim 6, wherein:
the first end plate has a peripheral surface and the axial thickness of the first end plate is a minimum axial thickness of the first end plate between the peripheral surface and the center bore of the first end plate and the second end plate has a peripheral surface and the axial thickness of the second end plate is a minimum axial thickness of the second end plate between the peripheral surface and the center bore of the second end plate.

8. The conveyor pulley of claim 1, wherein:
the first end plate has axially opposite exterior and interior surfaces and the first pair of bearings are positioned adjacent the exterior and interior surfaces of the first end plate.

9. The conveyor pulley of claim 1, wherein:
the first end plate has an axial thickness and the bearings of the first pair of bearings each have an axial thickness and a combined axial thickness of the first pair of bearings is less than the axial thickness of the first end plate.

10. The conveyor pulley of claim 1, wherein:
the pulley includes a cylindrical drum having a hollow interior with a center axis of rotation and first and second openings to the hollow interior at axially opposite first and second ends of the drum, the first end plate is in the first opening of the drum and the second end plate is in the second opening of the drum.

11. A conveyor pulley comprising:
a pulley having a cylindrical exterior surface and first and second end plates at axially opposite ends of the exterior surface, the first and second end plates having respective first and second center bores;
a first shaft end extending into the first end plate center bore;
a second shaft end extending into the second end plate center bore; and,
a first pair of bearings mounted on the first shaft end and mounted in the first end plate center bore in axially spaced relationship;
a first shaft seal mounted on the first shaft end and in the first end plate center bore between said first pair of bearings.

12. The conveyor pulley of claim 11, wherein:
the first shaft seal is a pair of annular seals mounted on the first shaft end in the first end plate center bore between the first pair of bearings.

13. A conveyor pulley comprising:
a pulley having a cylindrical exterior surface and first and second end plates at axially opposite ends of the exterior surface, the first and second end plates having respective first and second center bores;
a first shaft end extending into the first end plate center bore;
a second shaft end extending into the second end plate center bore; and,
a first pair of bearings mounted on the first shaft end and mounted in the first end plate center bore;
a second pair of bearings is mounted on the second shaft end and is mounted in the second end plate center bore;
said first pair of bearings being spaced axially from each other on the first shaft end and said second pair of bearings being spaced axially from each other on the second shaft end;
a first shaft seal mounted on the first shaft end and in the first end plate center bore between said first pair of bearings and a second shaft seal mounted on the second shaft end and in the second end plate center bore between said second pair of bearings.

14. A conveyor pulley comprising:
a pulley having a cylindrical exterior surface and first and second end plates at axially opposite ends of the exterior surface, the first and second end plates having respective first and second center bores;
a first shaft end extending into the first end plate center bore;
a second shaft end extending into the second end plate center bore; and,
a first pair of bearings mounted on the first shaft end and mounted in the first end plate center bore,
the first end plate has an axial thickness and the bearings of the first pair of bearings each have an axial thickness and a combined axial thickness of the first pair of bearings is less than the axial thickness of the first end plate;
the first end plate has a peripheral surface and the axial thickness of the first end plate is a minimum axial thickness of the first end plate between the peripheral surface and the center bore of the first end plate.

15. A conveyor pulley comprising:
a pulley having a cylindrical exterior surface and a center axis of rotation;
a first support at one end of said pulley, said first support having an inner and an outer surface;
a first shaft end projecting from the pulley through said first support coaxially with the pulley center axis;
a second support at the other end of said pulley, said second support having an inner and an outer surface;
a second shaft end projecting from the pulley through said second support coaxially with the pulley center axis;
a first pair of bearings mounted on the first shaft end and supporting the pulley for rotation about the pulley center axis; and
a second pair of bearings mounted on the second shaft end and supporting the pulley for rotation about the pulley center axis;

said first pair of bearings being axially spaced on said first shaft, one of said first pair of bearings is positioned adjacent said outer surface of said first support and the other of said first pair of bearings is positioned adjacent said inner surface of said first support;

said second pair of bearings being axially spaced on said second shaft, one of said second pair of bearings being positioned adjacent said outer surface of said second support and the other of said second pair of bearings being positioned adjacent said inner surface of said second support; and wherein said first pair of bearings is axially spaced a distance greater than the axial thickness of said one or said other of said first pair of bearings.

16. The conveyor pulley of claim 15, wherein:

the first shaft end and the second shaft end are coaxial and separate from each other and the first pair of bearings are spaced axially from each other on the first shaft end and the second pair of bearings are spaced axially from each other on the second shaft end.

17. The conveyor pulley of claim 15, wherein:

the pulley has a hollow interior and axially opposite first and second end plates having respective first and second axially aligned center bores, and the first pair of bearings are mounted in the center bore of the first end plate and the second pair of bearings are mounted in the center bore of the second end plate.

18. A conveyor pulley comprising:

a pulley having a cylindrical exterior surface and a center axis of rotation;

a first shaft end projecting from the pulley coaxially with the pulley center axis;

a second shaft end projecting from the pulley coaxially with the pulley center axis;

a first pair of bearings mounted on the first shaft end and supporting the pulley for rotation about the pulley center axis;

a second pair of bearings mounted on the second shaft end and supporting the pulley for rotation about the pulley center axis;

said first shaft end and said second shaft end are coaxial and separate from each other;

said first pair of bearings are spaced axially from each other on said first shaft end and said second pair of bearings are spaced axially from each other on said second shaft end; and a first shaft seal mounted on said first shaft end between said first pair of bearings and a second shaft seal mounted on said second shaft end between said second pair of bearings.

19. The conveyor pulley comprising:

a pulley having a cylindrical exterior surface and first and second end plates at axially opposite ends of the exterior surface, the first and second end plates having respective first and second center bores;

a first shaft end extending into the first end plate center bore;

a second shaft end extending into the second end plate center bore; and a first pair of bearings mounted on the first shaft end in axial spaced relationship and mounted in the first end plate center bore;

each of said pair of bearings having an axial thickness, and said axial spacing between said bearings being greater than the axial thickness of either of said bearings.

20. The conveyor pulley of claim 19, wherein:

a first shaft seal is mounted on the first shaft end and is mounted in the first end plate center bore between the first pair of bearings.

21. A conveyor pulley comprising:

a pulley having a cylindrical exterior surface and first and second end plates at axially opposite ends of the exterior surface, the first and second end plates having respective first and second center bores;

a first shaft end extending into the first end plate center bore;

a second shaft end extending into the second end plate center bore; and, a first pair of bearings mounted on the first shaft end and mounted in the first end plate center bore, said first pair of bearings having an axial thickness and being axially spaced a distance greater than the axial thickness of one or the other of said first pair of bearings.

22. The conveyor pulley of claim 21, further including a second pair of bearings mounted on the second shaft end and mounted in the second end plate center bore, said second pair of bearings having an axial thickness and being axially spaced a distance greater than the axial thickness of one or the other of said second pair of bearings.

* * * * *